3,326,815
PROCESS FOR THE MANUFACTURE OF AQUEOUS CLAY SUSPENSIONS
Hugo Werner, Hermulheim, near Cologne, and Hans-Werner Ziegler and Bruno Przybylski, Knapsack, near Cologne, Germany, assignors to Knapsack Aktiengesellschaft, a corporation of Germany
Filed Sept. 29, 1964, Ser. No. 400,061
Claims priority, application Germany, Oct. 2, 1963, K 50,969
5 Claims. (Cl. 252—314)

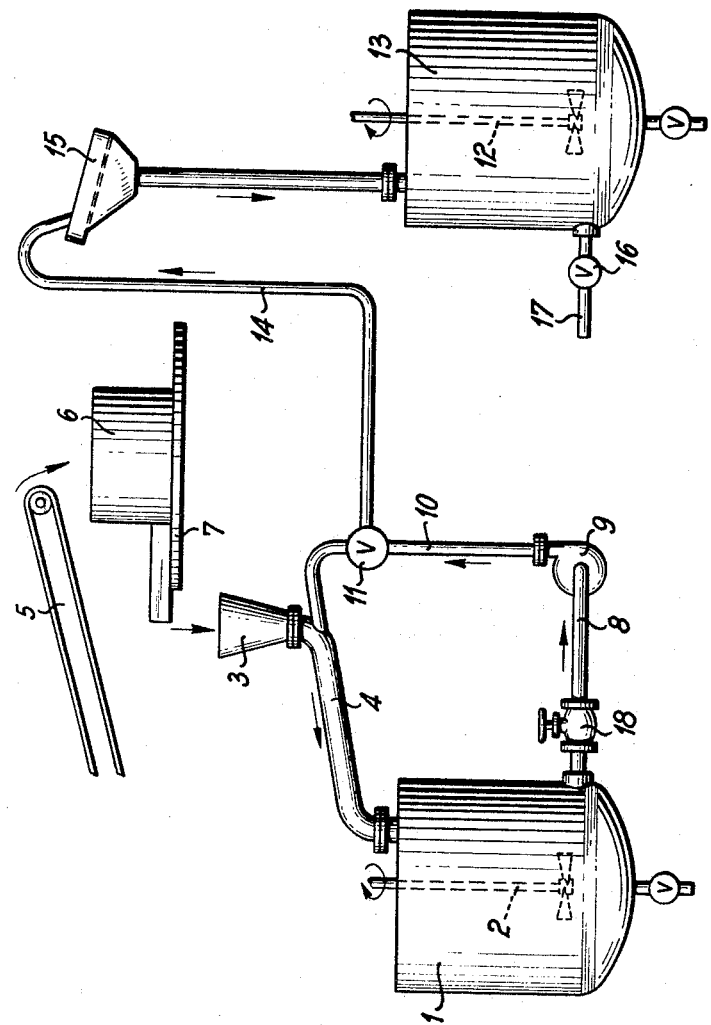

Aqueous clay or bentonite suspensions having a given density, which are also termed clay pulps, are known to constitute valuable binding agents e.g. for use in the pelletizing of crude phosphate powders so as to obtain phosphate pellets.

Suspensions of this type can be prepared by a process, wherein a suitable suspension container provided with a feed line having an allotted feed funnel is gradually charged with a quantity of water adapted to the capacity of the suspension container and charged concurrently therewith and through the same feed funnel with a quantity of lump-shaped, e.g. noodle-shaped clay sufficient to produce by intense stirring a suspension having the desired density which is determined by permanent hydrometer testing.

The manufacture of phosphate pellets calls, e.g. for the use of clay suspensions having a density of 1.17 to 1.18 corresponding to a solid matter content of about 29 to 30% by weight. Suspensions having such content of solid matter are difficult to prepare because clay and water are difficult to supply at a uniform feed rate while maintaining a given quantitative ratio. This is due to the different composition and nature of natural clay which often varies in plasticity and water content. However, the conversion of clay grades of different plasticity into lump form requires different treatment times which imply irregular supply of lumpy clay to the suspension container and jeopardize the preparation of suspensions having a given density. Sometimes, when the clay is supplied to the suspension container over a relatively long distance due to the clay crusher being locally spaced from the said container, the feed line may become clogged and so arrest the supply of clay and water.

When lump-shaped clay is introduced direct from the crusher into the suspension container which is often not possible without an intermediary transport means being used due to the crusher being positioned at a location relatively remote from the suspension container, the same difficulties will arise, i.e. the connecting chutes or runways become clogged by the sticky clay, or the conveyor belt serving as intermediary transport means must permanently be cleansed by hand in order to remain serviceable.

The present invention now provides a process which obviates the above difficulties and enables aqueous clay or bentonite suspensions having a desired density and a determined solids content to be prepared.

The process of the present invention for making aqueous clay and/or bentonite suspensions having a given density comprises first charging an appropriate suspension container with a predetermined amount of water, then adding lumpy clay and/or bentonite with intense stirring through a feed line having an allotted feed funnel in a quantity sufficient to produce a suspension having the desired density which is determined by hydrometer testing, continuously withdrawing from the suspension container during the clay and/or bentonite addition a portion of the water introduced thereinto or of the suspension formed therein, and recycling the portion withdrawn into the said feed line to serve therein to convey and partially suspend the clay and/or bentonite supplied.

An essential prerequisite to the fairly rapid suspending of clay in water is the introduction of the solid in appropriate form into the suspension container. For making clay suspensions, it has proved advantageous to transform clay as received from a clay pit, e.g. in a circular screen feeder, into worms about 40 to 100 mm. long and about 8 mm. wide, and to feed the worms through a feed funnel and an allotted feed line into the suspension container.

The solid converted to lump form is conveyed inside the feed line to the suspension container with the help of the water introduced thereinto or the suspension formed therein which is recycled. Cycling, per hour, 2 to 3 times the amount of water (in the form of the suspension) necessary for making the suspension ensures smooth introduction of the solid.

The process of the present invention can be carried out, e.g. with an apparatus as shown in the accompanying drawing.

A suspension container 1 provided with an intense stirrer 2 is first charged with a given amount of water and solid matter in lump form is then added with vigorous stirring through feed funnel 3 and feed line 4. The solid supplied through a conveyor belt 5 is comminuted in a circular screen feeder 6 delivering the lumpy solid through a rotating plate 7 to feed funnel 3. In order to convey the solid inside feed line 4, a portion of the water introduced into or a portion of the suspension formed in suspension container 1 is continuously withdrawn through line 8 having a stopcock 18 and conveyed with pump 9 through line 10 to feed line 4. Once the pulp has the specified density, which is determined by repeated hydrometer testing, the supply of solid feed is arrested, and the pulp is stirred so as to obtain a homogeneous suspension. Cutoff valve 11 is then closed, the suspension is removed from suspension container 1 through lines 8 and 10 and conveyed through line 14 to reservoir 13 having a stirring means 12. Coarse suspension constituents are eliminated with the aid of swing screen 15 before the suspension is delivered to reservoir 13 from which the suspension can be withdrawn according to requirements through line 17 having a stopvalve 16.

During the discharge of suspension container 1 with the feed line 4 being designed so as to be movable, a second suspension container can be fed with solid matter and water so that the suspensions of the type described herein can be prepared in continuous manner.

The process of the present invention offers the advantage of obviating adjustment and maintenance of an exact quantitative ratio of solid matter to water in the preparation of clay and/or bentonite suspensions having a given density. The excess proportion of water or suspension recycled to serve as the agent conveying and dissolving the solid obviates obstruction in the feed line to the suspension container and accelerates the supply and the suspending of the solid. This results in shorter working times reduced by about 20 to 30% for the preparation of a given quantity of clay suspension as compared with previous methods. Furthermore, clay and bentonite grades of any plasticity and nature can be used with no prejudice to the present process.

*Example*

Suspension container 1 having a capacity of 17 cubic meters was first charged with 14 cubic meters water and lumpy clay was then introduced with intense stirring through feed funnel 3 and the allotted feed line 4. The clay had been comminuted in circular screen feeder 6 and formed therein into worms 8 mm. wide and 40 to 50 mm. long. To convey the clay, a portion of the water introduced into suspension container 1 was continuously removed therefrom and pumped through cycle line 10 into feed line 4. Suspension container 1 was charged, per hour, with 6 tons clay and about 30 cubic meters water or suspension were cycled per hour. Once the clay suspension had a density of 1.17 to 1.18, which was determined by hydrometer testing, the clay supply was arrested and the suspension was stirred for about a further 15 minutes. By further preparation of the clay the density of the suspension increased up to a constant value of 1.19 to 1.21, corresponding to a solids content of 29 to 30% by weight. The prepared clay suspension was removed through lines 8 and 10 and conveyed through line 14 to reservoir 13 for further use.

We claim:

1. In the process for the manufacture of aqueous suspensions containing clay by introducing a predetermined amount of water into a suspension zone, and adding, with intense stirring, solid clay with the resultant formation of a suspension having a predetermined density, the improvement which comprises introducing said solid clay into said suspension zone through a substantially restricted feed line, reducing said solid clay to a lumpy size facilitating said introduction through said substantially restricted feed line before said clay is introduced therein, withdrawing from said suspension zone during the addition of said clay a portion of the water in said suspension zone, and pumping said portion into said feed line for helping convey said solid clay through said feed line and for partially suspending said solid clay in said portion being thereby recycled to said suspension zone.

2. A process as claimed in claim 1, wherein a portion of the suspension produced in the said suspension zone is continuously withdrawn from the said suspension zone and recycled by pumping it into the said feed line, the said recycled portion conveying and partially suspending the said clay.

3. A process as claimed in claim 1, wherein the said clay is used in the form of worms about 8 mm. wide and about 40 to 100 mm. long.

4. A process as claimed in claim 1, wherein, per hour, about 2 to 3 times the amount of water necessary for making the suspension is recycled in the form of the suspension through the said feed line for conveying the said clay.

5. A process as set forth in claim 1, wherein said clay is bentonite.

References Cited

UNITED STATES PATENTS

| 1,191,673 | 7/1916 | Davis | 259—67 X |
| 2,186,661 | 1/1940 | Bechtner et al. | 252—314 X |
| 2,559,518 | 7/1951 | Smith | 259—24 X |

OTHER REFERENCES

Reich: "Uber den Aufschluss von Bindentonen . . . ." in Tonindustriezeitung, 1953, pp. 127–130.

LEON D. ROSDOL, *Primary Examiner.*

R. D. LOVERING, *Assistant Examiner.*